(12) United States Patent  (10) Patent No.: US 8,123,431 B2
Chen  (45) Date of Patent: Feb. 28, 2012

(54) ROAD-BASED ELECTRICITY GENERATOR

(75) Inventor: Ron Chen, Zichron Ya'acov (IL)

(73) Assignee: Innovative Patents Ltd., Caesarea (IL)

( * ) Notice: Subject to any disclaimer, the term of this patent is extended or adjusted under 35 U.S.C. 154(b) by 0 days.

(21) Appl. No.: 13/108,295

(22) Filed: May 16, 2011

(65) Prior Publication Data

US 2011/0215589 A1   Sep. 8, 2011

Related U.S. Application Data

(63) Continuation-in-part of application No. 12/440,238, filed as application No. PCT/IL2007/001165 on Sep. 20, 2007, now abandoned.

(60) Provisional application No. 60/845,772, filed on Sep. 20, 2006.

(51) Int. Cl.
*F03G 7/00* (2006.01)
(52) U.S. Cl. .................................. 404/71; 290/1 R
(58) Field of Classification Search .............. 404/71; 290/1 R
See application file for complete search history.

(56) References Cited

U.S. PATENT DOCUMENTS

| 4,173,431 | A |   | 11/1979 | Smith |
|---|---|---|---|---|
| 4,212,598 | A |   | 7/1980 | Roche |
| 4,238,687 | A |   | 12/1980 | Martinez |
| 4,239,975 | A | * | 12/1980 | Chiappetti ............... 290/1 R |
| 4,980,572 | A |   | 12/1990 | Sen |
| 5,157,922 | A |   | 10/1992 | Rosenberg |
| 5,355,674 | A |   | 10/1994 | Rosenberg |
| 5,634,774 | A |   | 6/1997 | Angel |
| 6,204,568 | B1 |   | 3/2001 | Runner |
| 6,353,270 | B1 |   | 3/2002 | Sen |
| 6,756,694 | B2 |   | 6/2004 | Ricketts |
| 6,767,161 | B1 |   | 7/2004 | Calvo |
| 6,858,952 | B2 | * | 2/2005 | Gott et al. ............. 290/1 R |
| 6,949,840 | B2 |   | 9/2005 | Ricketts |
| 7,005,757 | B2 | * | 2/2006 | Pandian ............... 290/1 R |
| 7,067,932 | B1 |   | 6/2006 | Ghassemi |
| 7,145,257 | B2 |   | 12/2006 | Ricketts |
| 7,239,031 | B2 |   | 7/2007 | Ricketts |
| 7,541,684 | B1 |   | 6/2009 | Valentino |
| 7,550,860 | B1 | * | 6/2009 | Blumenthal ............ 290/1 R |
| 7,589,428 | B2 |   | 9/2009 | Ghassemi |

(Continued)

FOREIGN PATENT DOCUMENTS

DE          4034219          4/1992

(Continued)

OTHER PUBLICATIONS

Search Report for the corresponding European Patent Application No. 07827141.8 dated Oct. 22, 2010.

(Continued)

*Primary Examiner* — Gary S Hartmann
(74) *Attorney, Agent, or Firm* — The Law Office of Michael E. Kondoudis (57) ABSTRACT

Generating electricity from wheeled vehicles passing along a road, by positioning a hinged protruding flap to generate linear motion of an attached rack upon depression of the flap by a passing vehicle, converting the linear motion of the rack to a rotational motion of an axis by enabling rotation of the axis in one direction only, and regulating accumulated rotational motion to a specified range of rotation speeds. A flywheel is used to accumulate the rotations and enable a relatively stable electricity generation.

7 Claims, 8 Drawing Sheets

U.S. PATENT DOCUMENTS

| | | | |
|---|---|---|---|
| 7,629,698 B2 | 12/2009 | Horianopoulos | |
| 7,714,456 B1 | 5/2010 | Daya | |
| 7,847,422 B2 * | 12/2010 | Blumenthal | 290/1 R |
| 2001/0056544 A1 * | 12/2001 | Walker | 713/200 |
| 2002/0089309 A1 * | 7/2002 | Kenney | 322/1 |
| 2004/0160058 A1 | 8/2004 | Gott et al. | |
| 2008/0150297 A1 | 6/2008 | Shadwell | |
| 2009/0309370 A1 * | 12/2009 | Brand et al. | 290/1 R |
| 2009/0315334 A1 * | 12/2009 | Chen | 290/1 A |

FOREIGN PATENT DOCUMENTS

| | | |
|---|---|---|
| DE | 10108265 | 9/2002 |
| GB | 2399693 | 9/2004 |
| WO | 2004023621 | 3/2004 |

OTHER PUBLICATIONS

International Search Report and Written Opinion mailed Sep. 16, 2008 for PCT/IL2007/001165.

* cited by examiner

ROAD-BASED ELECTRICITY GENERATOR

CROSS REFERENCE TO RELATED APPLICATIONS

This application is a Continuation In Part, and claims the benefit of, U.S. patent application Ser. No. 12/440,238 filed on Mar. 5, 2009 as a national phase of PCT application PCT/IL2007/001165 filed on Sep. 20, 2007, and further claims the benefit of and of U.S. Provisional Patent Application 60/845,772 filed on Sep. 20, 2006, all of which are incorporated herein by reference.

BACKGROUND

1. Technical Field

The present invention relates to renewable energy, and more particularly, to energy generation from vehicles.

2. Discussion of the Related Art

The massive road traffic is a potential energy resource. Various publications, such as U.S. Pat. No. 4,238,687 and German Patent documents 4034219 and 10108265, which is incorporated herein by reference in their entirety, disclose devices for generating energy from passing vehicle by causing them to actuate a rotating device.

BRIEF SUMMARY

One aspect of the invention provides a system for electricity generation from a plurality of wheeled vehicles moving along a road, the system comprising: a flap, hingedly connected at a first end at a road level to a frame, and having two states: (i) a protruding state, in which the flap is inclined upwards and a second end of the flap is above road level, and (ii) a level state, in which the flap is on a level with the road, wherein the flap is arranged to be moved from the protruding state to the level state by vehicles moving across the flap and pushing down the second end of the flap, a rack and a pinion, the rack being vertical and jointedly connected by a bar to the second end of the flap, and the pinion being mounted on an input axis and arranged to turn upon vertical movement of the rack due to the vertical pushing down of the second end of the flap by passing vehicles, a transmission connected to the input axis and arranged to transmit only rotations thereof due to downward movements of the rack to an output axis, and de-couple the input axis from the output axis upon rotations of the former resulting from upward movements of the rack, to accumulate rotations in one direction, and a flywheel connected to the output axis and arranged to receive the transmitted rotations from the transmission, and operate an alternator over a belt to produce electricity from the accumulated rotation of the flywheel.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1A:
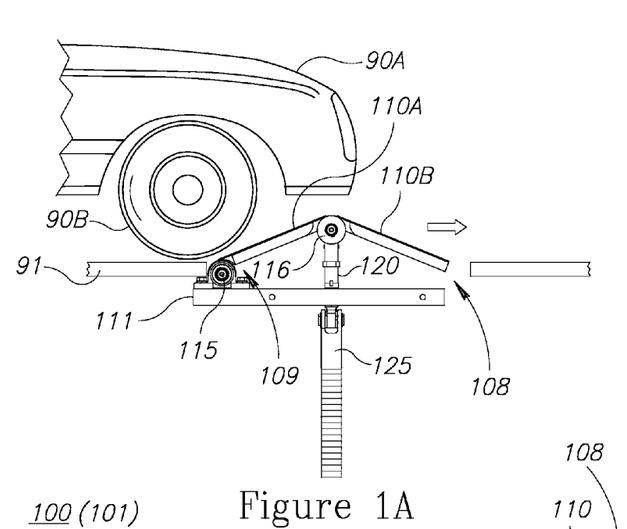
FIGS. 1A-1C are high level schematic illustrations of the operation and some configurations of flaps in a system for electricity generation from a plurality of wheeled vehicles moving along a road, according to some embodiments of the invention.
Figure 1B:
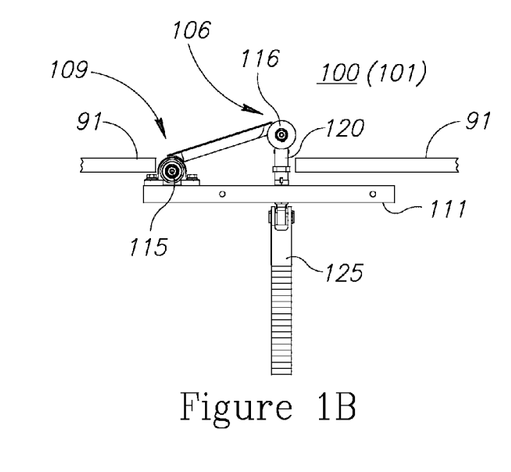
Figure 1C:
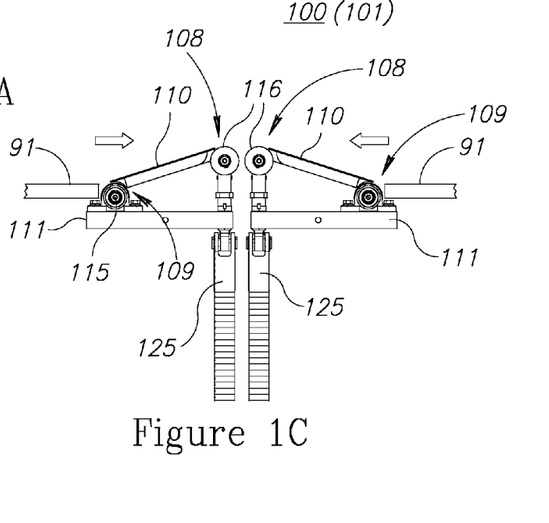

FIGS. 1A-1C are high level schematic illustrations of the operation and some configurations of flaps 110 in a system 100 for electricity generation from a plurality of wheeled vehicles 90A moving along a road 91, according to some embodiments of the invention.

System 100 comprises a flap 110, hingedly connected at a first end 109 at a road level by a pivot 115 to a frame 111. Flap 110 may comprise a single flap (FIG. 1B), an articulated flap having flap 110A and a flap extension 110B that form a bump like protrusion in road 91 (FIG. 1A) or two systems 100 may be opposedly combined (installed pairwise in a back to back configuration) to form a bump like protrusion in road 91 (FIG. 1C). The formation of flap 10 depends on the expected traffic on road 91 and the expected traffic directions (marked by arrows).

System 100, and especially flap 110, have two states: (i) a protruding state 101 (FIGS. 1A-1C), in which flap 110 is inclined upwards and a second end 108 of flap 110 is above road level, and (ii) a level state 102 (FIGS. 2-5), in which flap 110 is on a level with road 91.

Flap 110 is arranged to be moved from protruding state 101 to level state 102 by wheels 90B of vehicles 90A moving across flap 110 and pushing down second end 108 of flap 110. The rotation of flap 110 in respect to pivot 115 is translated to a rotational movement which is in turn used to generate electricity, as described below.

System 100 utilizes the recurring tilting of flap 110 by vehicles' wheels 90B to accelerate a flywheel and then convert the tilting motion to energy after a baseline rotational energy has been accumulated.

Figure 2A:
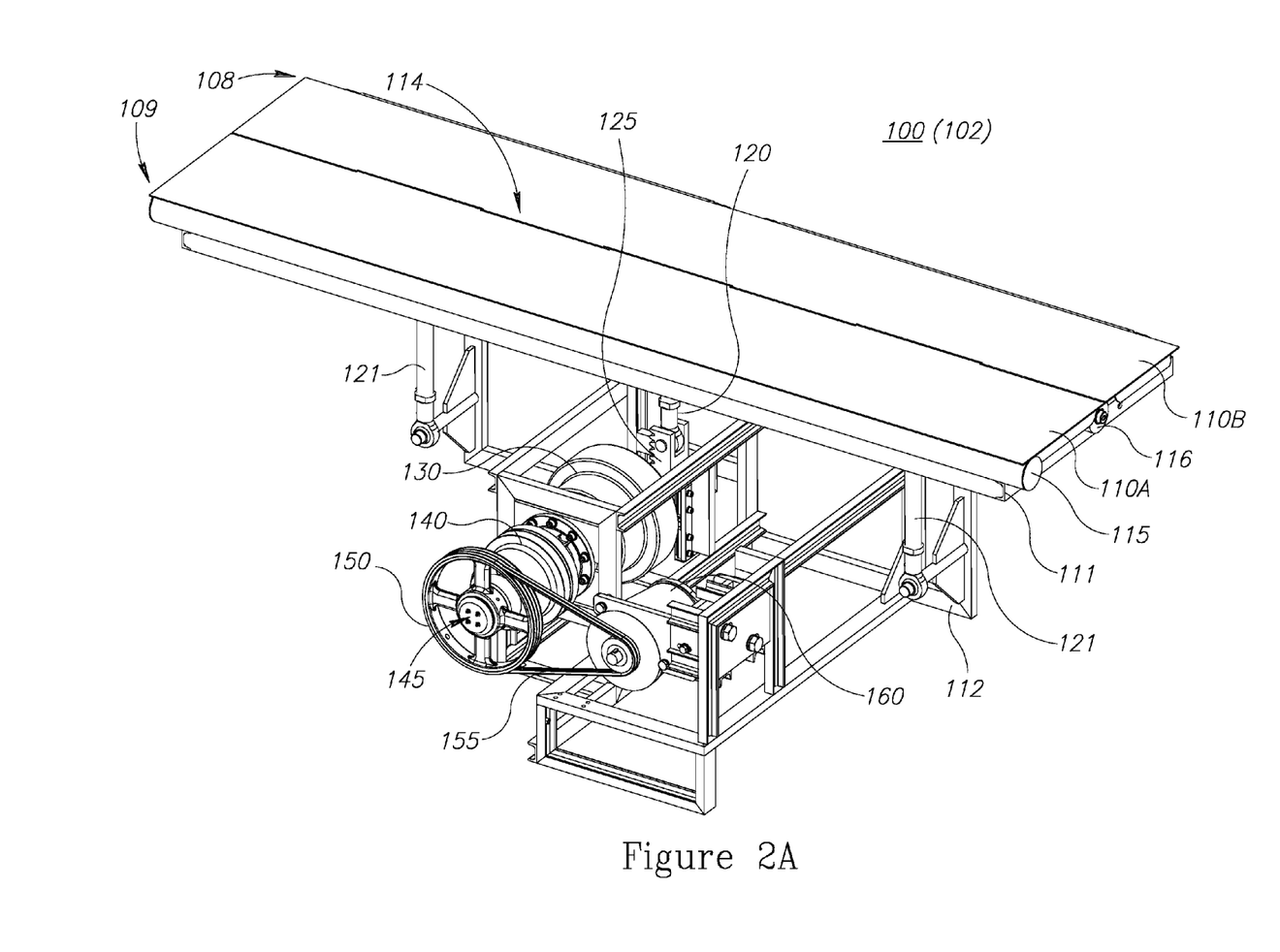
FIGS. 2A-2B are perspective views of a system for electricity generation from a plurality of wheeled vehicles moving along a road, according to some embodiments of the invention.
Figure 2B:
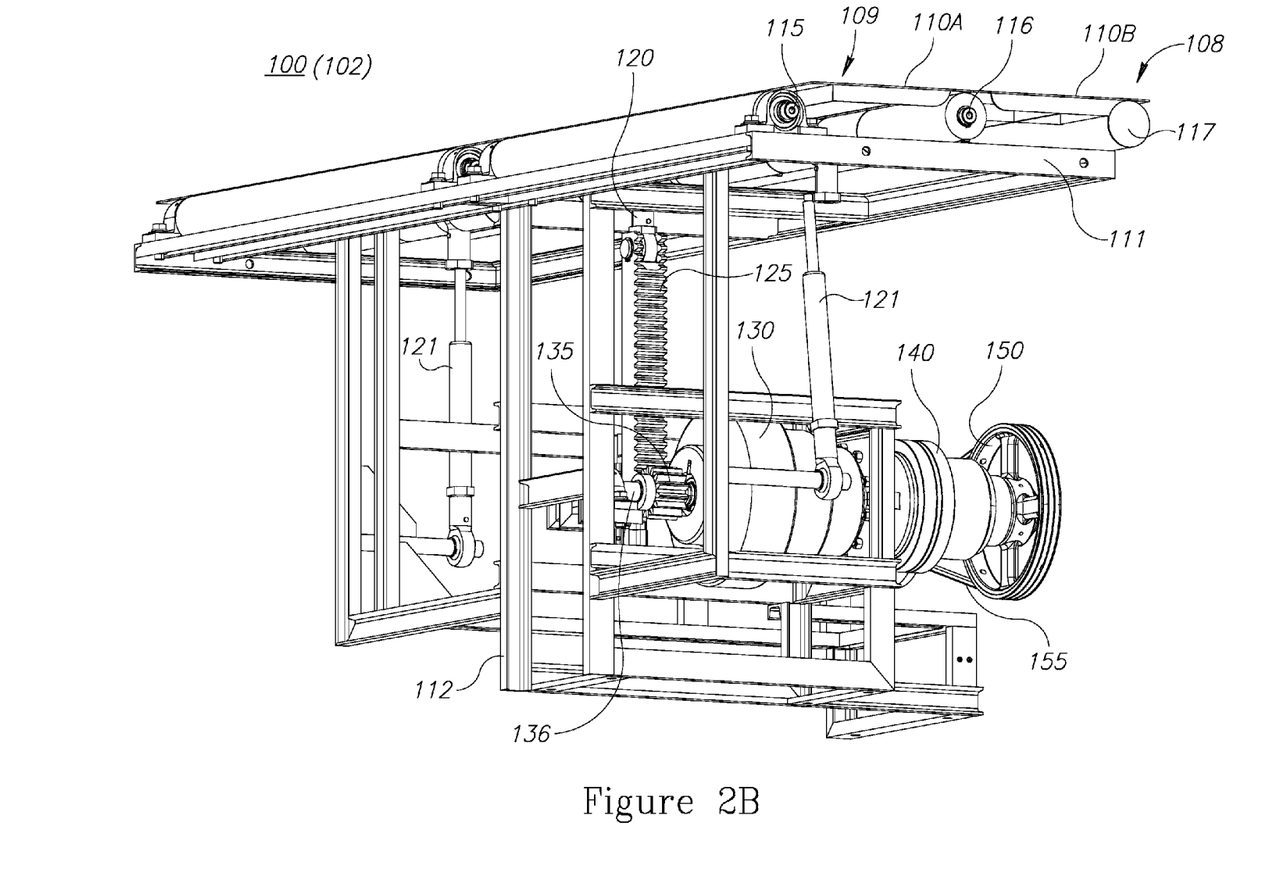
Figure 3:
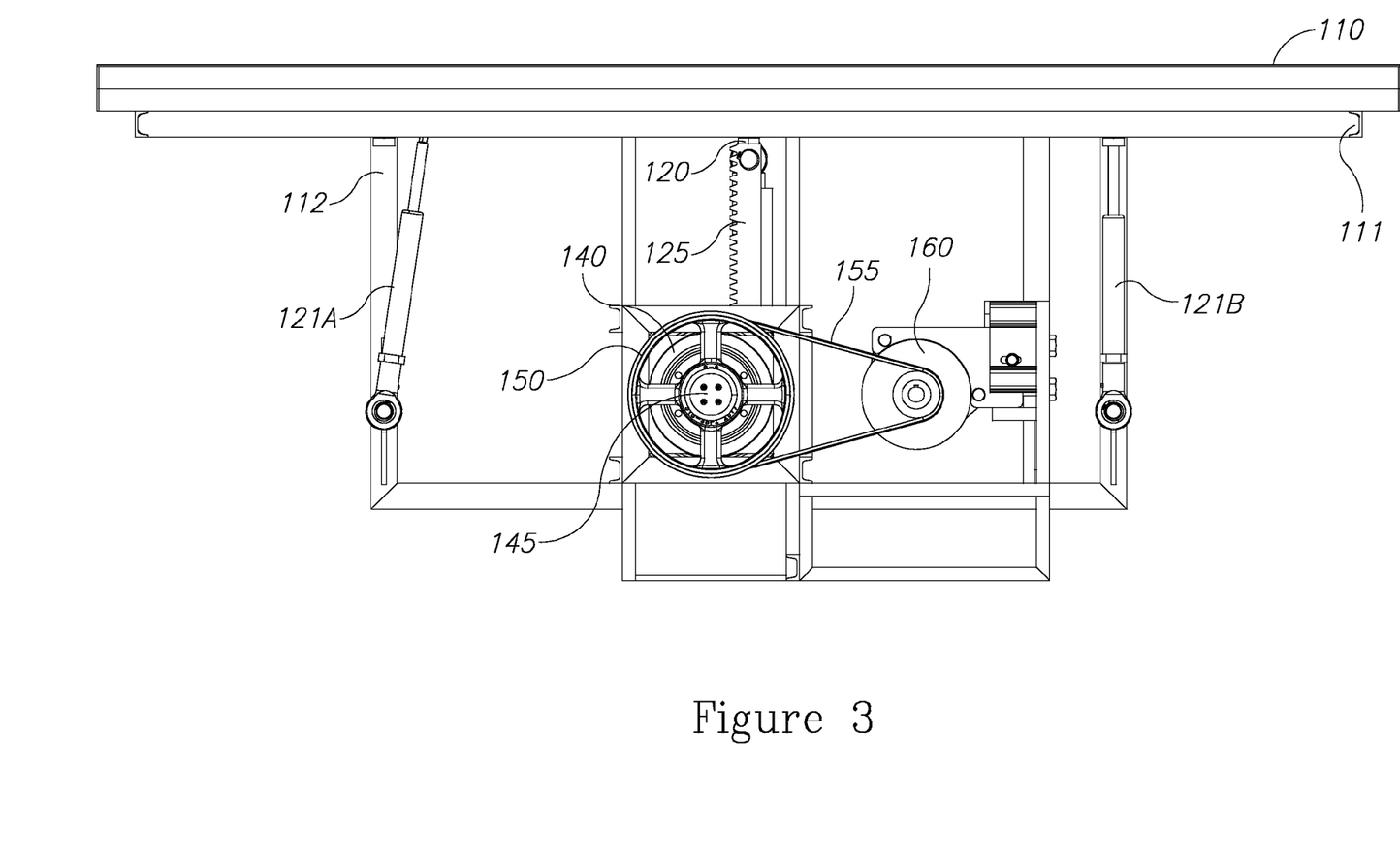
FIG. 3 is a side view and FIG. 4 is a cross sectional side view of a system for electricity generation from a plurality of wheeled vehicles moving along a road, according to some embodiments of the invention.
Figure 4:
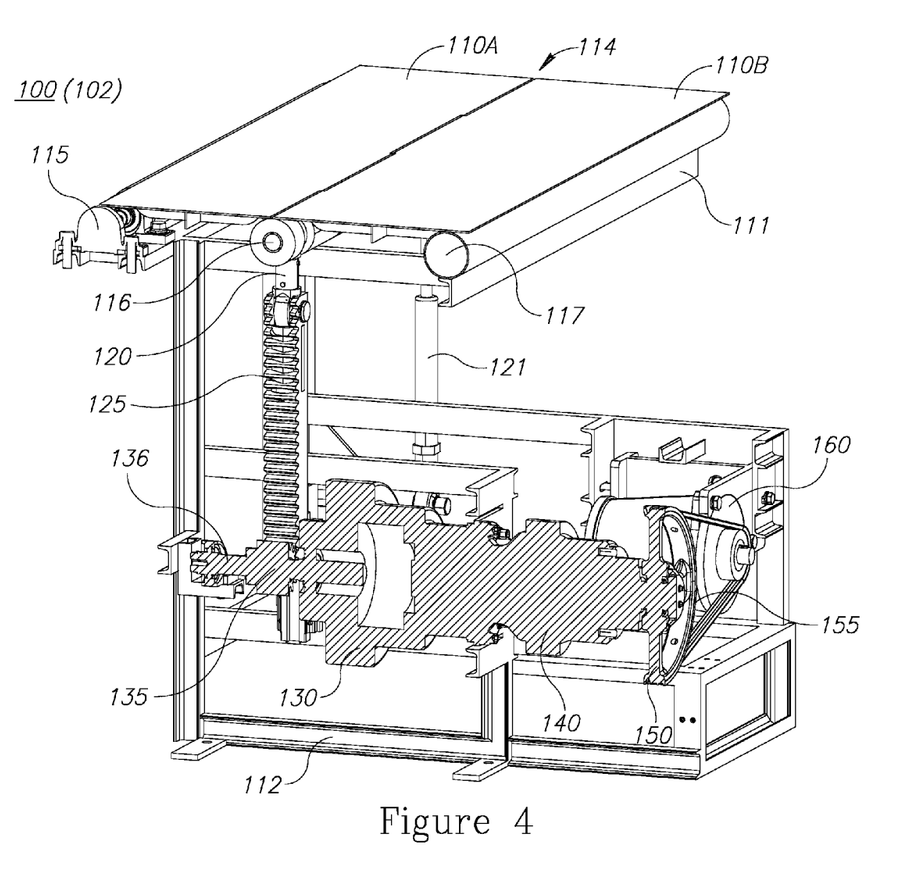
Figure 5:
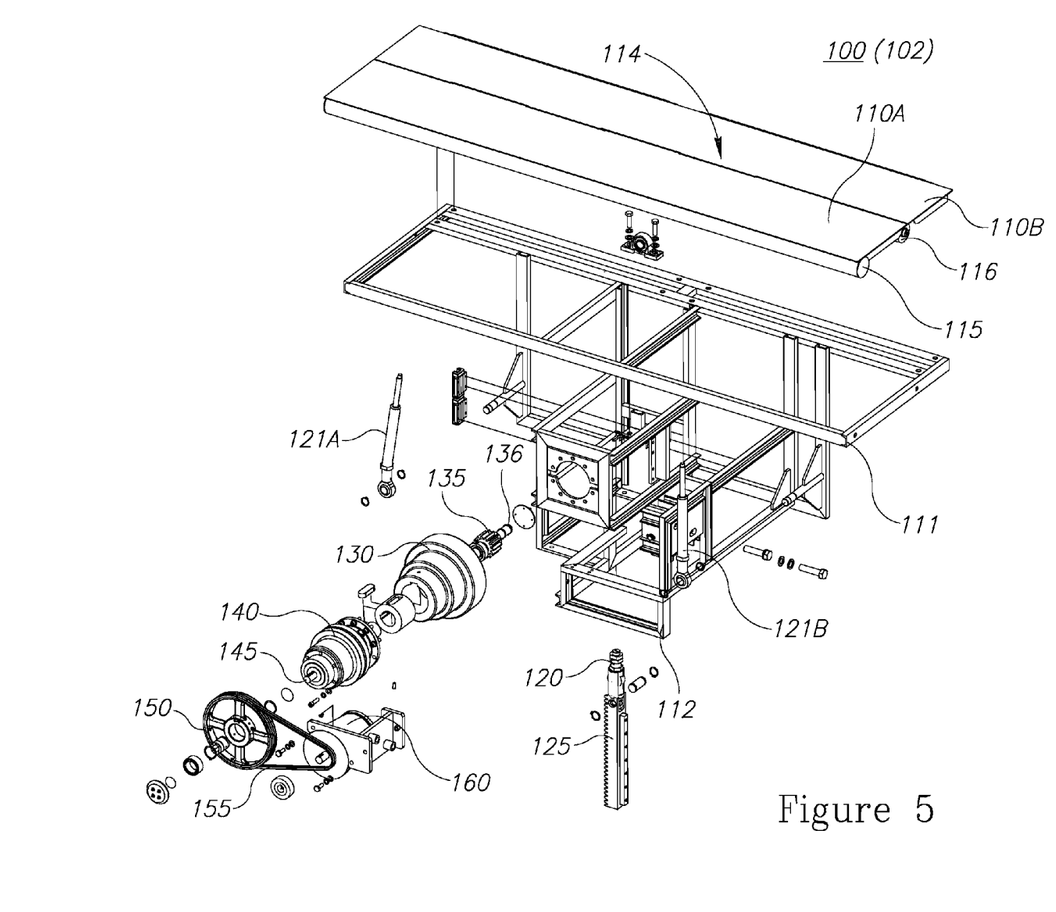
FIG. 5 is an exploded view of a system for electricity generation from a plurality of wheeled vehicles moving along a road, according to some embodiments of the invention.

FIGS. 2A-2B are perspective views, FIG. 3 is a side view and FIG. 4 is a cross sectional side view, and FIG. 5 is an exploded view, all of system 100, according to some embodiments of the invention.

System 100 comprises a rack 125 which is connected to second end 108 of flap 110, e.g. via pivot 116 and bar 120. Second end 108 may be at the end of flap 110 (FIGS. 1B, 1C) or in the middle of flap 110, as illustrated in FIG. 1A. The connection of rack 125 to flap 110 may be jointed to receive a horizontal component of force resulting from the rotation of flap 110 in respect to pivot 115. Rack 125 (in an essentially vertical position) is coupled to a pinion 135 which is mounted on an input axis 136 (in an essentially horizontal position). Pinion 135 is arranged to turn upon vertical movement of rack 125 due to the vertical pushing down of second end 108 of flap 110 by passing vehicles 90A, and thus translate the linear motion of rack 125 to a rotational motion of input axis 136.

System 100 further comprises a transmission 130 connected to input axis 136 and arranged to transmit only rotations thereof due to downward movements of rack 125 to an output axis 145, and de-couple input axis 136 from output axis 145 upon rotations of the former resulting from upward movements of rack 125, to accumulate rotations in one direction. Transmission 130 may comprise any type of power transmission, such as an automatic clutch. Transmission 130 allows rack 125 to return upwards while keeping contact with pinion 135, and to move flaps 110 back to protruding state 101, without annulling the generated rotation.

The rotational motion of output axis 145 is then transferred through a gear 140 to a flywheel 150 that is connected to output axis 145 and arranged to receive the transmitted rotations from transmission 130, and operate an alternator 160 over a belt 155 to produce electricity from the accumulated rotation of flywheel 150.

Edges 114 (FIG. 2A) of compound flap 110, i.e. the contact area between flap 110A and extension 110B, may be formed to ensure a smooth transition between protruding state 101 and level state 102 and continuous operation of system 100 over numerous vehicle passes.

System 100 may be embedded under road 91, within a frame 112 that may be connected to frame 11 from below. The various parts of system 100, such as transmission 130, gear 150, flywheel 150 and alternator 160 may be anchored to frame 112. Frame 112 may further support the smooth transition between protruding state 101 and level state 102 by supporting flap 110 at additional points except from rack 125 and bar 120, for example by stabilizers 121 (FIGS. 2A-2C), such as piston, springs, air springs, etc. attached to frame 112.

Flap extension 110B may be supported by a support 117 (FIGS. 2B, 4). For example, pivots 115, 116 and support 117 may be cylindrical. In particular support 117 may be arranged to allow the extension edge roll along frame 111 during the transition between protruding state 101 and level state 102.

Stabilizers 121 are arranged to stabilize flap 110 in it up and down movements, as well as to stabilize it in forwards-backwards movements resulting from its angular motion in respect to pivot 115. These motions are illustrated in FIGS. 3 and 5 in the oblique position of stabilizer 121A in respect to stabilizer 121B. Of course, both stabilizers 121A and 121B may be arrange to be in an oblique position, e.g. in level state 102, when flap 110 is at level with the road.

It is noted, that system 100 as described below first accumulates the rotational movements produced by single vehicles 90A to reach a minimal extent of rotation before starting the actual production of electricity. Then system 100 starts to convert additional rotations to electricity, while maintaining the rotational speed of flywheel 150 at a specified level. In this way, electricity is produced continuously and is used effectively by a load, such as charging batteries or other storage forms, road lighting system and so on. Gear 140 is used to maintain a specified rotation speed of flywheel 150 within specified limits, that optimize the generation of electricity.

System 100 may be positioned at various positions in roads, such along a straight section in which traffic jams often occur, at turns, at section with expected specified vehicle speeds that optimize the efficiency of the system, etc.

Several systems 110 may be installed adjacent to each other, to multiply energy production in the location.

Figure 6:
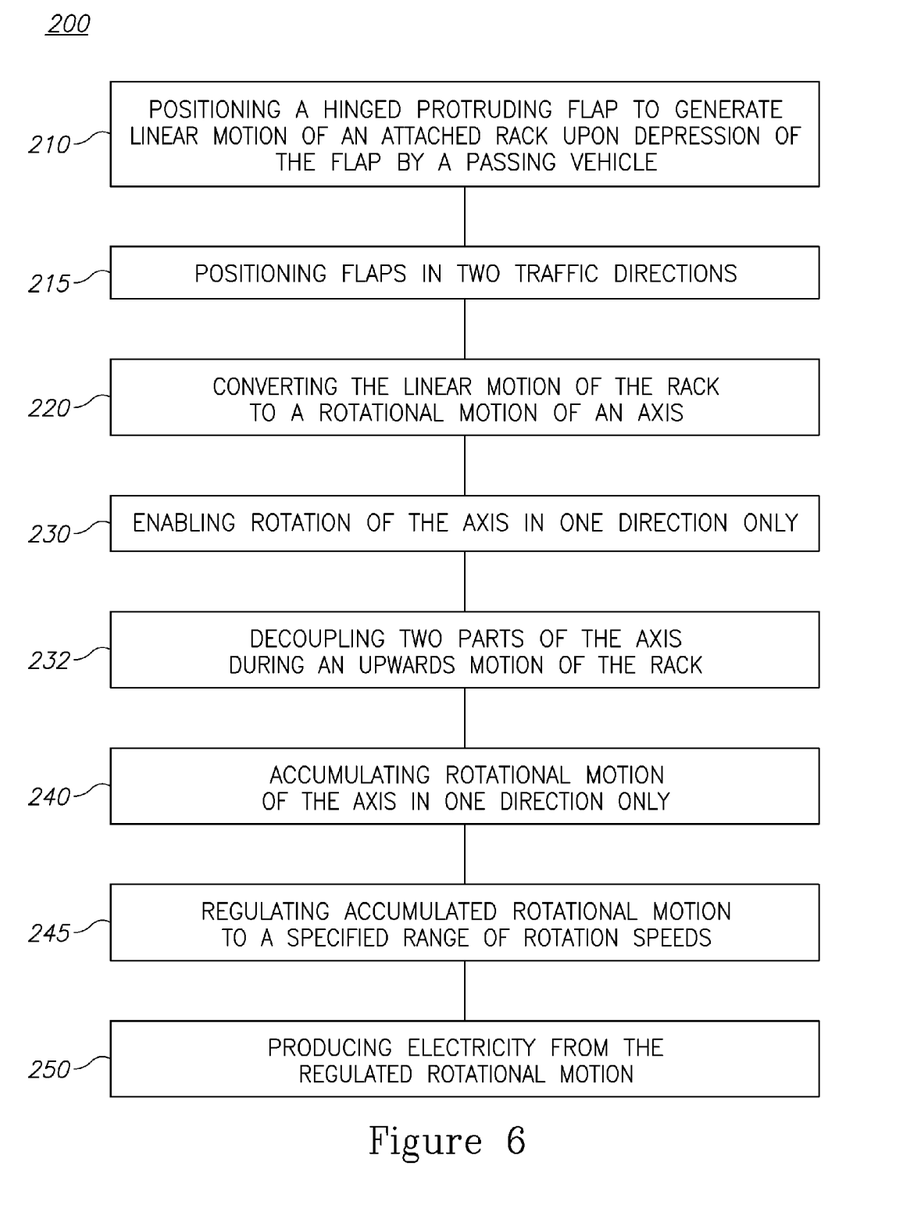
FIG. 6 is a high level flowchart illustrating a method of energy generation from a plurality of wheeled vehicles moving along a road, according to some embodiments of the invention.

FIG. 6 is a high level flowchart illustrating a method 200 of energy generation from a plurality of wheeled vehicles moving along a road, according to some embodiments of the invention.

Method 200 comprises the following stages: positioning a hinged protruding flap to generate linear motion of an attached rack upon depression of the flap by a passing vehicle (stage 210), converting the linear motion of the rack to a rotational motion of an axis (stage 220, e.g. by a rack and a pinion) by enabling rotation of the axis in one direction only (stage 230), regulating accumulated rotational motion (stage 240) to a specified range of rotation speeds (stage 245) and producing electricity from the regulated rotational motion (stage 250).

Method 200 may comprise positioning flaps in two traffic directions (stage 215) to generate electricity (250) from two-way traffic.

Enabling rotation of the axis in one direction only (stage 230) may be carried out by a transmission arranged to decouple two parts of the axis during an upwards motion of the rack (stage 232), one part attached to the pinion in a rack and pinion configuration, the other part accumulating rotation the enabled direction (stage 240).

Figure 7A:
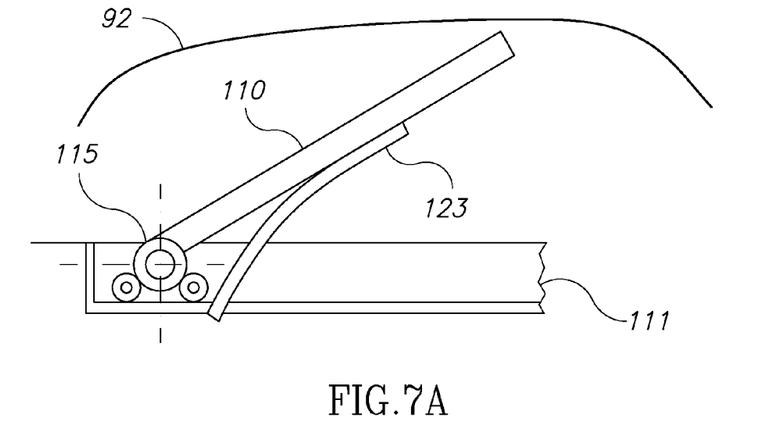
FIGS. 7A and 7B are schematic diagrams of the system according to the present invention without and with (respectively) the electrical conversion means, according to some embodiments of the invention.

FIG. 7A shows a schematic diagram of the system according to the present invention without the electrical conversion means, according to some embodiments of the invention.

The system comprises an arced cover strip 92 that runs across a traffic lane or multiple lanes. The cover strip 92 is mounted upon a housing, or frame 111 that is embedded within the road, directly under the cover strip. The cover strip 92 is abutted upon a wing 110 that is attached to an axis of rotation 115 also located within the housing 111. The upper end of the wing 110 touches the cover strip above the road level. The wing 110 is also connected to a spring 123, such as a compression spring. Whenever the cover strip 92 is pressed down, the wing 110 rotates around the axis 115 and is subsequently returned to its original position by the spring 123.

According to some embodiments of the invention, the wing 110 may be comprised of a plurality of adjacent wings that may be connected together in a telescopic manner.

Figure 7B:
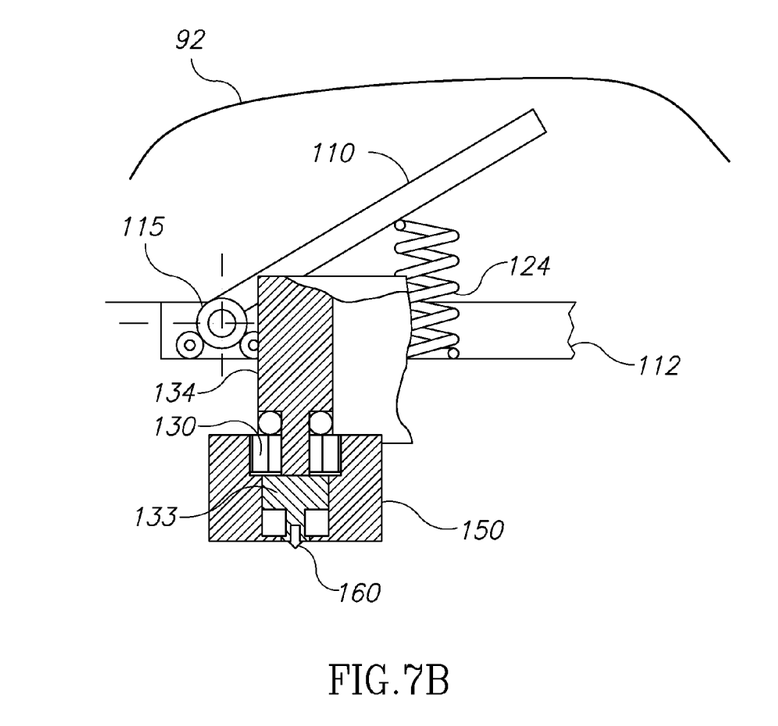

FIG. 7B shows a schematic diagram of the system according to the present invention now with the electrical conversion means depicted, according to some embodiments of the invention.

The system further comprises, in addition to the aforementioned description of FIG. 7A, a fly wheel and a rotor 133, a stator 134, centered within the rotor 133, a spring 124 (variant of 123) connecting the wing 110 and the housing, or frame 112, an electro-magnetic generator 160 connecter to the rotor and a clutch 130. The clutch 130 transfers the rotational motion to flywheel 150 and rotor 133 which activate in turn the electro-magnetic generator 160. Vehicles driving over the cover strip 92 press it down causing the rotor to rotate and drive the generator to generate alternating current which is then modified and passed on. When the wing 110 is released, the spring 124 returns it back to the initial position.

According to some embodiments of the invention when the system, a relaxed phase (i.e., no vehicle over the cover strip) the cover strip is protruding above the surface of the road necessitating a deriver to slow down.

According to some embodiments of the invention the electricity produced by the generator is then transferred to power supply connected to a stabilizer for accumulating the energy to be used for any electric powered appliance. Alternatively, it may be redirected to power grid via bi-directional power meter.

According to some embodiments of the invention, apart from the cover strip 92, all the system's components are located inside the housing 112, under road surface, thus imitating a the size and shape of a standard road hump.

According to some embodiments of the invention, multiple vehicles passing one after another transfer a small amount of its kinetic energy to the device, ensuring, with the use of said flywheel 150 a smooth and constant rotation of the rotor. This results in a stable and permanent electricity generation.

According to some embodiments of the invention the electro-magnetic generator is a generator standard to the art. The electricity generated by this operation is then transferred, using traditional technology and components (i.e. batteries, regulators, DC motors etc), to connected streetlights or any other electric power appliance or holding station. Alternative connectivity method is based on synchronized regulator that enables a direct connection of generated electricity to power grid, via a bi-directional power meter. Using the present system acts as a "power station", while generated power is credited to the system's owner.

According to some embodiments of the invention, the cover strip 92 encases three layers of material that provide strength and durability, that include rubber, composite material and a thin metal layer. The first layer is thin metallic layer. A second layer made of material that acts as a sound and vibration barrier encloses the steel layer. These two layers are then encased in a composite material. This results in a rigid but flexible material that will withstand wear and heat generated by vehicles constantly riding across it as well as the resultant continuous flexing.

According to some embodiments of the invention the housing and most of the components contained therein are made of metal for robustness.

According to some embodiments of the invention, at its highest point, the cover strip sits approximately 9 cm above the surface of the road. In the arced position, the cover strip is at least 40 cm wide.

The current invention solves the problem of the prior art by first accumulating rotation by the flywheel, until a steady rotation rate is achieved, and only then electricity generation is initiated, and electricity is generated from the additional incoming rotations, while keeping the flywheel turning at an approximately constant rate. This way produces a relatively steady output current that can be effectively used and stored.

Demand for alternative energy resources is ever-growing due to rising fossil fuel costs and environmental influences of energy production. The current invention extracts energy from moving vehicles, and so regenerates some of the braking energy of the vehicles. In view of the large and growing number of wheeled vehicles, braking energy regeneration is becoming an important alternative source of energy. The invention further provides a local energy source for road related devices. This provision spares remote electricity generation and also allows electricity supply on demand—in relation to traffic density.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. A system for electricity generation from a plurality of wheeled vehicles moving along a road, the system comprising:
   a flap, hingedly connected at a first end at a road level to a frame, and having two states:
   (i) a protruding state, in which the flap is inclined upwards and a second end of the flap is above road level, and
   (ii) a level state, in which the flap is on a level with the road, wherein the flap is arranged to be moved from the protruding state to the level state by vehicles moving across the flap and pushing down the second end of the flap wherein the flap comprises an extension hingedly connected to the second end to yield a bump like protrusion in the road,
   a rack and a pinion, the rack being vertical and jointedly connected by a bar to the second end of the flap, and the pinion being mounted on an input axis and arranged to turn upon vertical movement of the rack due to the vertical pushing down of the second end of the flap by passing vehicles,
   a transmission connected to the input axis and arranged to transmit only rotations thereof due to downward movements of the rack to an output axis, and de-couple the input axis from the output axis upon rotations of the former resulting from upward movements of the rack, to accumulate rotations in one direction,
   and a flywheel connected to the output axis and arranged to receive the transmitted rotations from the transmission, and operate an alternator over a belt to produce electricity from the accumulated rotation of the flywheel, wherein said alternator is mounted on an axis spaced apart from said output axis, wherein the transmission comprises a gear arranged to maintain the rotation of the flywheel within a specified range, and wherein the flywheel regulates accumulated rotational motion within a specified range of rotational speeds for stabilizing electricity generation at a steady pre-defined rate.

2. The system of claim 1, positioned within a frame below road level.

3. Two systems of claim 1, positioned back to back to generate electricity from two-way traffic.

4. A method of regulating accumulated rotational motion to specified range of rotations speeds for stabilizing electricity generation from a plurality of wheeled vehicles moving along a road to a defined value, comprising:

positioning a hinged protruding flap arranged to generate linear motion of an attached rack upon depression of the flap by a passing vehicle wherein the flap comprises an extension hingedly connected to the second end to yield a bump like protrusion in the road;

converting the linear motion of the rack to a rotational motion of an axis by enabling rotation of the axis in one direction only;

connecting a flywheel, arranged to receive the transmitted rotations from the transmission, to the output axis;

operating an alternator over a belt to produce electricity from the accumulated rotation of the flywheel, wherein said alternator is mounted on an axis spaced apart from said output axis;

regulating accumulated rotational motion to a specified range of rotation speeds; and producing electricity from the regulated rotational motion.

5. The method of claim 4, wherein the conversion of linear to rotational motion is carried out by a rack and pinion.

6. The method of claim 5, wherein the enabling rotation of the axis in one direction only is carried out by a transmission arranged to decouple two parts of the axis during an upwards motion of the rack, one part attached to the pinion the other part accumulating rotation the enabled direction.

7. The method of claim 4, further comprising positioning flaps in two traffic directions to generate electricity from two-way traffic.

* * * * *